May 19, 1964

R. G. ZENICK 3,133,849

ASSEMBLY MACHINE

Filed Oct. 24, 1960

INVENTOR
RAYMOND G. ZENICK
BY
Robert J. Merrick

May 19, 1964
R. G. ZENICK
3,133,849
ASSEMBLY MACHINE
Filed Oct. 24, 1960
5 Sheets-Sheet 2
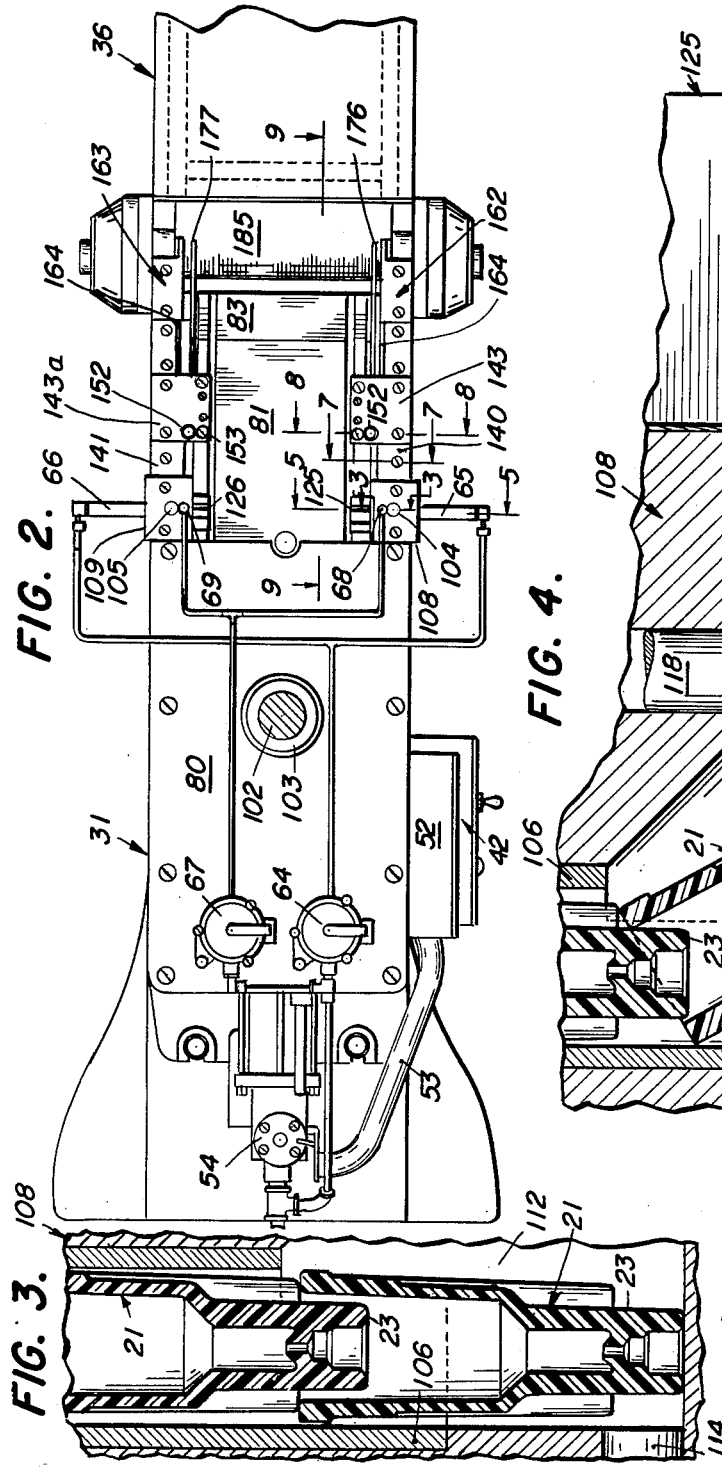
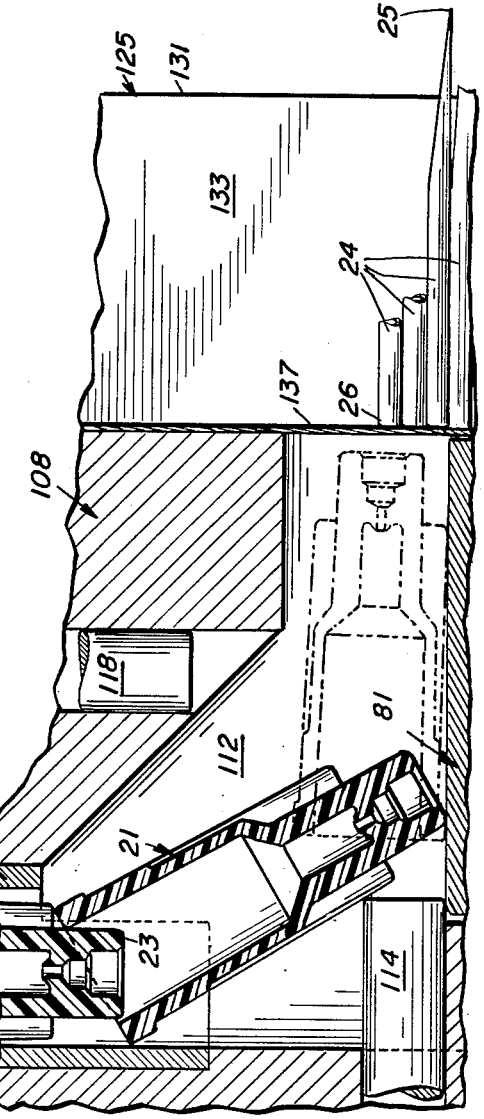
INVENTOR
RAYMOND G. ZENICK
BY
Robert T. Merrick May 19, 1964  R. G. ZENICK  3,133,849
ASSEMBLY MACHINE
Filed Oct. 24, 1960
5 Sheets-Sheet 3
FIG. 5.
FIG. 6.
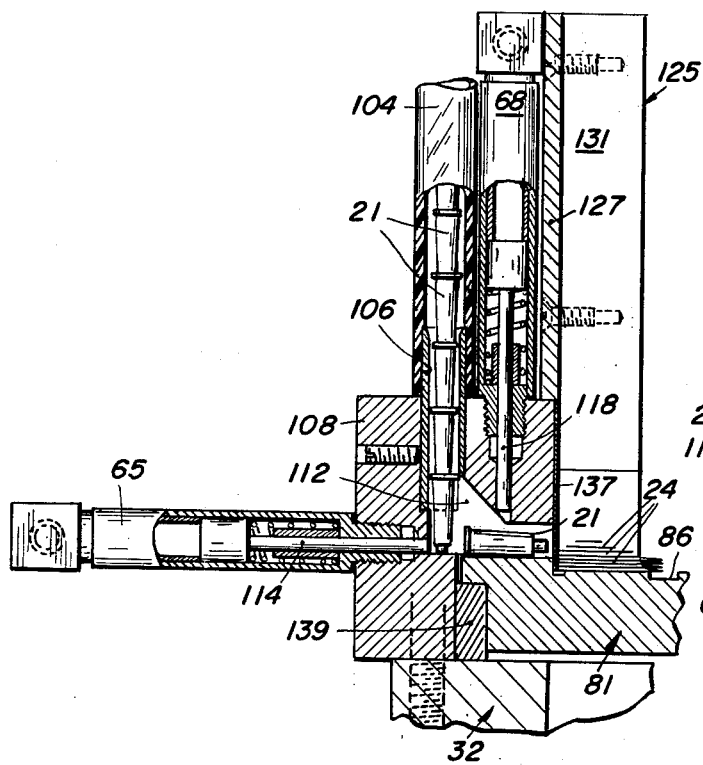
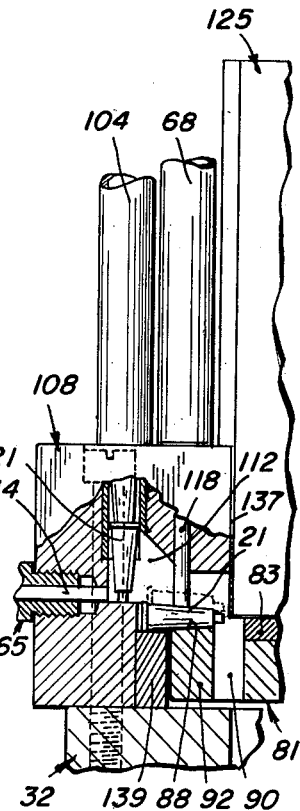
FIG. 8.
FIG. 7.
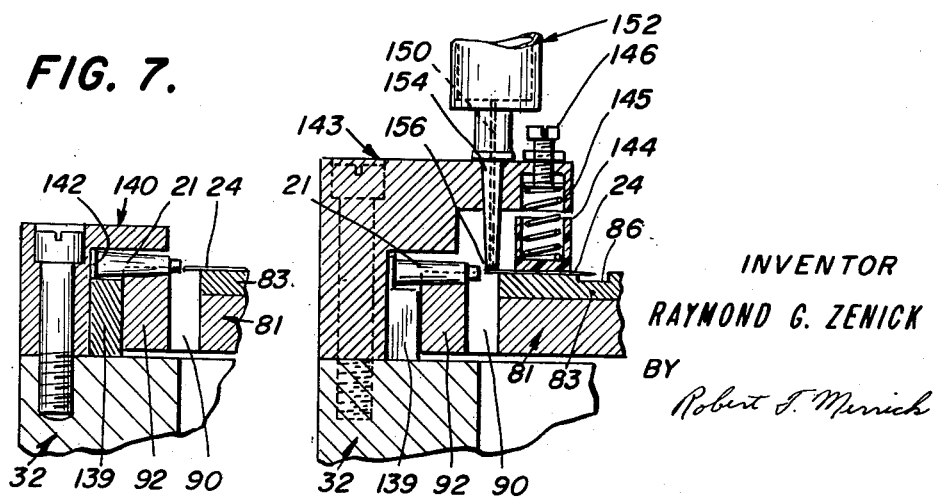
INVENTOR
RAYMOND G. ZENICK
BY
Robert T. Merrick

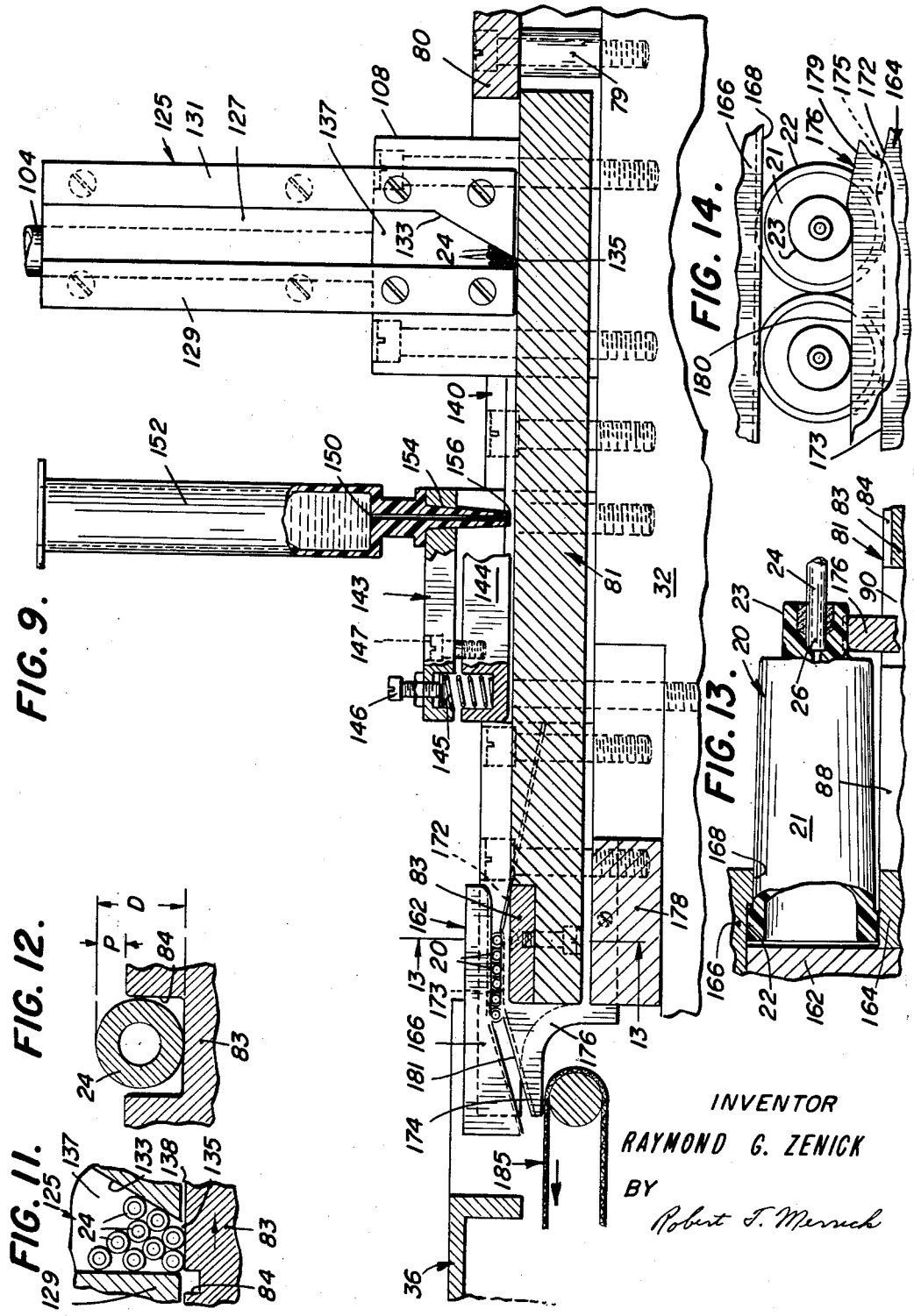

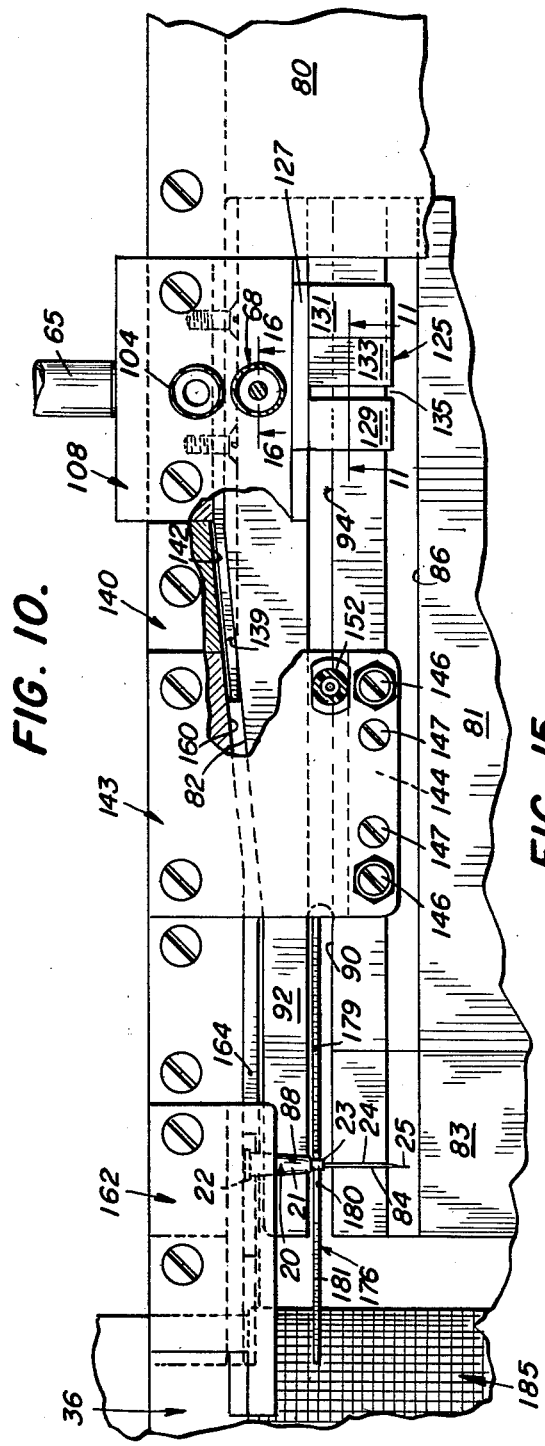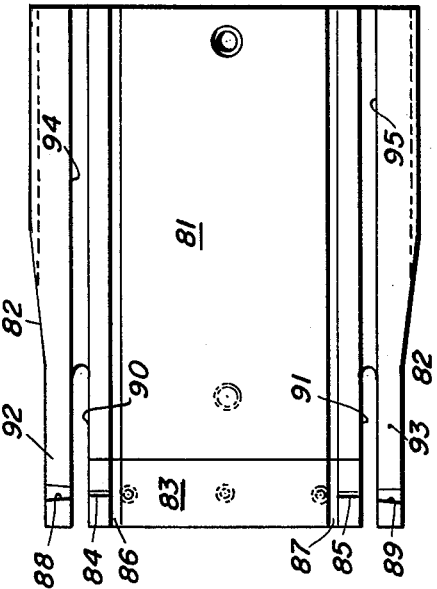

United States Patent Office 3,133,849
Patented May 19, 1964

3,133,849
ASSEMBLY MACHINE
Raymond G. Zenick, Glendale, Calif., assignor to Pharmaseal Laboratories, Glendale, Calif., a corporation of California
Filed Oct. 24, 1960, Ser. No. 64,457
11 Claims. (Cl. 156—423)

This invention relates to an automatic machine for assembling hypodermic needles, and more particularly to a machine for attaching hubs to metal cannulas.

Ordinary hypodermic needles are expensive, and are usually re-used many times. Before each use, the needle must be carefully cleaned and sterilized. Unless extreme care is taken, infectious hepatitis and other diseases may be transmitted from one patient to another. Moreover, the points of hypodermic needles are delicate and must be frequently sharpened to remove burrs, shovel-nose points, fish hooks, and dull edges. It is therefore desirable to have an inexpensive hypodermic needle which can be discarded after a single use. The machine of this invention automatically assembles such needles, thereby reducing their manufacturing costs.

Needle assembly machines having a plurality of cannula holders mounted on a rotary assembly table are described in a copending patent application, Serial Number 821,757, filed June 22, 1959, now U.S. Patent No. 2,998,050. These machines have an intermittent drive means which rotates the assembly table to position the cannula holders at successive work stations. Such machines have been very successful in the assembly of the larger size needles. However, they are somewhat complicated and expensive to make. Also, they require careful adjustment and maintenance to assure firm grasping of the cannulas without damaging their surfaces and accurate indexing of the rotary table at the work stations. These problems are particularly severe in the assembly of very small needles, such as 23 and 25 gauge needles.

It is therefore an object of this invention to provide a simplified, inexpensive needle assembly machine.

Another object of the invention is to provide a needle assembly machine capable of handling a wide range of cannula sizes.

Another object of the invention is to provide a needle assembly machine having a means for securely holding very small cannulas without damage.

A further object of the invention is to provide a needle assembly machine having an improved means of aligning the needle cannula with its respective hub.

A further object of the invention is to provide a needle assembly machine having an improved means of applying adhesive to the needle cannula.

A further object of the invention is to provide a needle assembly machine in which the needle is assembled in a continuous, uninterrupted operation.

A still further object of the invention is to provide a machine which can be easily and quickly converted to assembly needles of different sizes, by relatively unskilled labor.

Other objects and advantages of my invention will be apparent from the detailed description of the preferred example of the invention and from the accompanying drawings, in which:

FIGURE 2 is a top plan view of the invention with the slide advanced;

FIGURE 3 is an enlarged, fragmentary, sectional view on the line 3—3 of FIGURE 2;

FIGURE 4 is a sectional view similar to FIGURE 3, but showing the relation of the parts during retraction of the slide block and during positioning of the hub;

FIGURE 5 is an enlarged, fragmentary, sectional view, partially in elevation, on the line 5—5 of FIGURE 2, but showing the relation of the parts during retraction of the slide block and after positioning of the hub;

FIGURE 6 is a view similar to FIGURE 5, showing the relation of the parts with the slide block retracted;

FIGURE 7 is an enlarged, fragmentary, sectional view, partially in elevation, on the line 7—7 of FIGURE 2, but during advance of the slide and showing the relation of the parts when the needle is in registration with the hub guide 140;

FIGURE 8 is an enlarged, fragmentary, sectional view, partially in elevation, on the line 8—8 of FIGURE 2, during advance of the slide and showing the relation of the parts when the needle is in registration with the adhesive applicator 156;

FIGURE 9 is an enlarged, sectional view on the line 9—9 of FIGURE 2, with some parts shown in elevation and some parts broken away;

FIGURE 10 is a fragmentary, top plan view of the portion of the machine shown in FIGURE 9;

FIGURE 11 is a further enlarged, fragmentary, sectional view on the line 11—11 of FIGURE 10, but showing the relation of the parts near the end of the slide retraction;

FIGURE 12 is a still further enlarged, fragmentary, sectional view similar to FIGURE 11, but showing the relation of the parts with the slide block fully retracted;

FIGURE 13 is an enlarged, sectional view, partially in elevation, on the line 13—13 of FIGURE 9;

FIGURE 14 is a right side view of the structure shown in FIGURE 13;

FIGURE 15 is a top plan view of the slide block 81;

FIGURE 16 is an enlarged sectional view, partially in elevation, on the line 16—16 of FIGURE 10, but showing the relation of the parts with the slide almost fully retracted; and FIGURE 17 is a view similar to FIGURE 16, but showing the relation of the parts with the slide fully retracted.

Figure 1:
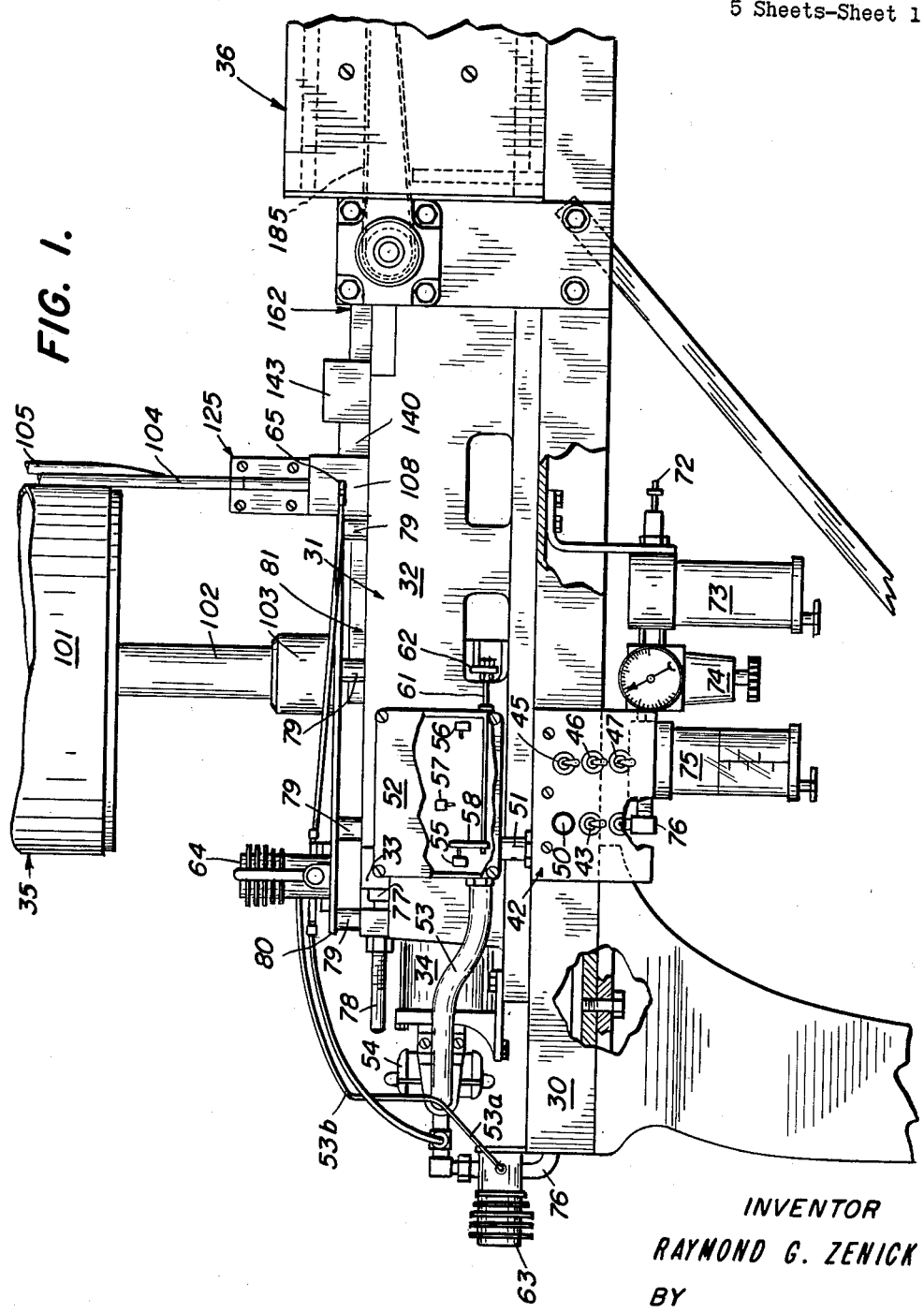
FIGURE 1 is an elevational view of the invention showing the relation of the parts with the slide block 81 retracted.

One type of hypodermic needle made by my assembly machine is described in more detail in a copending patent application Serial Number 559,627, filed January 17, 1956, now U.S. Patent No. 2,989,053. As shown in FIGURE 13 of this application, needle 20 has a plastic hub 21 and a metal cannula 24. One end of hub 21 has an outwardly projecting flange 22 while the opposite end has a reduced-diameter tip section 23. The base 26 of cannula 24 telescopes into tip section 23 and is preferably cemented therein. The opposite end of cannula 24 has a point 25.

FIGURES 1 and 2 show the overall arrangement of the assembly machine. A two position, reciprocating work feeder 31 is supported at a convenient working height by bench 30. Work feeder 31 includes a casting 32 and a reciprocating slide 33. A driving means, such as an electrically controlled air motor 34, advances and retracts reciprocating slide 33. A hub feeding unit, generally indicated as 35, orients loose hubs to a tip down position and feeds them to the hub positioning blocks 108, 109. Cannulas are fed to the work area by hoppers 125, 126 and adhesive is fed by reservoirs 152, 153. Adhesive is applied to the base of a cannula and the cannula assembled into the hub during the forward stroke of slide 33, as will be subsequently described. After assembly, the needles pass through a curing oven 36.

*Details of the Air Supply System*

As shown in FIGURE 1, the switch box 42 has a main control switch 43, an oven heater switch 45, an oven conveyor switch 46, a hub feeder switch 47 and an oven pilot light 50. Wires from the main control switch 43 pass through conduit 51 to control box 52. Wires also pass from the main control switch 43 through conduit 51, control box 52, and conduits 53 and 53a to the solenoid of valve 63. This solenoid is energized to supply air to shuttle valve 54 when main control switch 43 is on. When main control switch 43 is off, the line connecting valve 63 to shuttle valve 54 is exhausted to the atmosphere.

The air system is conveniently located beneath bench 30. Air is supplied to inlet 72 and passes through air filter 73, pressure regulator 74, lubricator 75 and pipe 76 to valve 63. Other pipes (not shown) supply air from lubricator 75 to valves 64 and 67.

Valve 54 is a shuttle control valve containing two solenoids. In the retracted position of slide 33, dog 58 trips microswitch 55, at the left side of control box 52. This energizes one of the solenoids of shuttle valve 54, positioning the shuttle so as to admit air to motor 34, advancing slide 33. Trip rod 61, on which dog 58 is mounted, has a length adjustment 62 and is connected with slide 33.

At the end of the advance stroke, dog 58 trips microswitch 56, energizing the second solenoid of shuttle valve 54. This positions the shuttle at admit air to the opposite end of motor 34, thus retracting slide 33. Switch 56 also energizes the solenoid of hub positioning valve 64. This supplies air momentarily to hub positioning cylinders 65 and 66, as will be subsequently described. Release of switch 56 exhausts the pipe connecting valve 64 to cylinders 65 and 66 to atmosphere.

During retraction of slide 33, dog 58 snaps switch 57 to the on position. This energizes the solenoid of valve 67, supplying air to the hub hold down cylinders 68, 69. As dog 58 advances, it snaps switch 57 to the off position, exhausting the pipe connecting valve 67 to cylinders 68, 69 to atmosphere.

In the completely retracted position, slide 33 rests against the stop 77, the latter having a threaded adjustment 78. In this position, dog 58 again trips microswitch 55 initiating another advance stroke.

*Details of the Slide Mechanism*

Above the casting 32 of work feeder 31, spacers 79 support a top plate 80. A slide block 81 (FIGURES 9 and 15) is mounted on slide 33. Slide block 81 has a removable cannula holder 83 and an inwardly tapering side wall section 82 providing a front end of reduced width.

Small transverse cannula grooves 84, 85 are located near each side of cannula holder 83, the size of the grooves being adapted to receive a particular size of cannula for the needles being assembled. At the inner ends of grooves 84, 85, channels 86, 87 are provided so that the cannula points 25 are held above the surface of cannula holder 83.

Slots 90, 91 extend longitudinally into slide block 81 to provide arms 92, 93. Each arm has a transverse hub groove 88, 89 axially aligned with the respective cannula groove 84, 85. The walls of hub grooves 88, 89 taper inwardly toward the center line of slide block 81 and are dimensioned so tha the hubs fit loosely in the grooves until they are subsequently urged inwardly. Channels 94, 95 extend inwardly beyond slots 90, 91 to protect the base of cannulas in cannula hopper 125, as will subsequently be described.

*Details of the Hub Feeding Mechanism*

The hub feeder 35 has a vibratory feeder 101 mounted on a support 102, the latter being attached by mounting block 103 to top plate 80. The hubs are oriented to a base up, tip down position and fed to hub feeding tubes 104, 105 in a manner similar to that described in the copending patent application Serial Number 821,757, filed June 22, 1959. Feeding tube 104 is preferably made of a flexible material, such as polyvinyl plastic, to isolate hub positioning block 108 from the vibration of feeder 101, and is attached to hub positioning block 108 by tubular metal connector 106.

As shown in FIGURES 3–6, the hubs are stacked in tube 104 with each tip 23 extending into the flange end of the subjacent hub. Hub positioning block 108 has a slot-like chamber 112, large enough for a hub to turn from a vertical to a horizontal position. When microswitch 56 is tripped at the end of the advance stroke of slide 33, air is supplied by valve 64 to hub positioning cylinder 65, urging hub positioning piston 114 forward. As slide 33 retracts, dog 58 snaps switch 57 to the on position. This energizes the solenoid of valve 67 providing air to cylinder 68, driving piston 118 down against hub 21. Slide 33 continues to retract until groove 88 is directly beneath the chamber 112 (FIGURES 6, 16 and 17), at which time a hub 21 is pushed into groove 88.

*Details of the Cannula Feeding Mechanism*

As shown in FIGURES 4 and 9–12, cannula hopper 125 is mounted on hub positioning block 108 and separated therefrom by spacer 137. Hopper 125 has a back plate 127, a front guide section 129 and a rear guide section 131. Rear guide section 131 has a portion 133 which slopes inwardly to define a narrow outlet 135. The base ends 26 of cannulas 24 rest against spacer 137 and the cannula points 25 project outwardly from cannula hopper 125.

Under hopper 125, slide block 81 is cut away to provide channels 86 and 87, slots 90 and 91, and channels 94 and 95. Thus as slide block 81 moves under hopper 125 the cannula points are located over channels 86 and 87 and do not contact slide 81. Also, the cannula bases are located over slots 90, 91 or over their extending channels 94, 95 so that they cannot be damaged by the surface of slide 81.

Slide block 81 retracts until cannula groove 84 is located immediately beneath hopper outlet 135. As groove 84 passes front section 129, a cannula drops into the groove. Groove 84 is only slightly wider than the diameter of cannula 24, but has a depth equal to about two-thirds of the cannula diameter. Thus a portion P of the cannula, equal to about one-third of the cannula diameter D, extends above the top surface of cannula holder 83.

Excess cannulas in hopper 125 are pushed back by the portion P of the cannula projecting above groove 84, and are displaced upwardly along the sloping portion 133 of rear guide section 131. This displacement separates the cannulas and prevents them from sticking together.

A small space 138 between the bottom of hopper 125 and cannula holder 83 allows the cannula 24 to pass under the hopper without damage. In general this space is approximately 0.002 inch greater than the projecting portion P of cannula 24 and is set by locating hopper 125 in the desired position, then tightening the four bolts mounting it to block 108.

*Details of the Assembly Operation*

As shown in FIGURES 7 and 10, a needle hub is carried in hub groove 88 from hub positioning block 108 to hub guide 140. In guide 140, hub flange 22 rides on rail 139, and the hub is forced inwardly by positioning cam 142. In the assembly block 143 (FIGURE 8), cannula 24 is held tightly down in groove 84 by a press block 144, preferably made of nylon or similar plastic which will not damage the surface of the cannula sliding under it. Press block 144 is urged downwardly by springs 145, the tension of which is adjustable by bolts 146. Bolts 147 adjust the gap between press block 144 and the top surface of cannula holder 83.

As shown in FIGURE 8, adhesive reservoir 152 has a tapered connector 154 through which extends adhesive passage 150. The lower end of connector 154 terminates in a downwardly directed applicator tip 156 on which a drop of adhesive forms. I have found it particularly convenient to use a disposable plastic reservoir, such as a molded styrene syringe body, and to pre-mix the adhesive used.

As cannula 24 brushes across the surface of applicator tip 156, adhesive is wiped off on the top surface of cannula base 26. Since the applicator tip is directed downwardly, the adhesive drops have a consistent and uniform shape and are cut off sharply by cannula base 26, even when a particularly viscous adhesive is used. It should also be noted, that adhesive is drawn from applicator tip 156 much more rapidly when the machine is in operation than when the adhesive is merely allowed to drop from tip 156 by gravity. Thus it appears likely that some of the adhesive applied is drawn from within the applicator tip 156.

As slide 81 continues to advance, assembly cam 160 forces hub 21 toward cannula 24 so that cannula base 26 telescopes into hub tip 23. The adhesive on the top surface of cannula base 26 flows around the cannula from the top side, displacing air from the space between the hub and the cannula. Thus air is not trapped as sometimes occurs when adhesive is applied completely around the cannula.

As will be noted from the above details, the cannula and its respective hub are placed in axially aligned grooves at the start of the assembly operation. Then the assembly is carried out in a single, continuous advance stroke. Thus there is no need for repetitively aligning the hub with a very small cannula at successive stations.

It should also be noted that this machine is extremely versatile in the various sizes of needles which can be assembled. In general, two or three gauges can be assembled without changes or major adjustments. For example, no such changes are needed to run 25, 26 or 27-gauge needles. When changes are made, it is only necessary to replace cannula holder 83, adjust the height of adhesive reservoir 152 and adjust the height of cannula hopper 125 to establish a suitable clearance space 138 between the bottom of the cannula hopper and a cannula in groove 84.

Details of the Needle Ejector

As shown in FIGURES 9, 10, 13 and 14, the assembled needles are advanced into hub retainers 162, 163. Hub retainer 162 has a hub holding groove defined by a lower guide rail 164 and an upper guide rail 166. Upper guide rail 166 has a downwardly depending flange 168 extending over the edge of hub flange 22, so as to hold the needle hubs slidably within the groove. Guide rail 164 has an upwardly sloping section 172, a horizontal section 173 and a downwardly sloping section 174. A stripper 175 is provided between the upwardly sloping section 172 and the horizontal section 173. The stripper may be a projection extending upwardly from guide rail 164 (as shown) or it may be a spring-loaded projection extending downwardly from the upper guide rail 166.

At the cannula end 23, the hub is supported by a tip guide rail 176 or 177. These guide rails are conveniently mounted on a stop 178 against which the slide 33 comes to rest at the end of its advance stroke. Tip guide rail 176 is parallel to guide rails 164, 166 and also has an upwardly slanting section 179, a horizontal section 180 and a downwardly sloping section 181. As slide block 81 carries the assembled needle into hub retainer 162, the upwardly slanting sections of guide rails 164 and 176 lift the needle from hub groove 88 and cannula groove 84. As successive needles are pushed into the hub retainer 162, needles on the far end of the retainer are displaced and slide down the guide rail section 174 to belt 185 which carries them through the curing oven 36.

Although the invention has been described in considerable detail for the purpose of illustration, it should be understood that those skilled in the art may make many changes and modifications without departing from the spirit of the invention as set forth in the appended claims.

I claim:
1. A machine for assembling hypodermic needles comprising: a longitudinally reciprocating slide; a transverse cannula groove in said slide; means for feeding a single cannula into said groove; a transverse hub groove in said slide axially aligned with said cannula groove; means for feeding a single hub into said groove; means for holding the cannula against axial movement during advance of the reciprocating slide; and means for axially advancing a hub in the hub groove toward a cannula in the cannula groove during advance of the slide, to thereby telescope a portion of the cannula transversely into a portion of the hub during a single, continuous, longitudinal stroke of said slide.

2. A machine for assembling hypodermic needles as set forth in claim 1, wherein a means for applying adhesive to one side only of the cannula is located between the cannula feeding means and the hub advancing means, whereby adhesive is applied to one side of the base of a cannula in the cannula groove during the advance stroke of the reciprocating slide.

3. A machine for assembling hypodermic needles as set forth in claim 2 wherein the means for applying adhesive to the cannula includes a downwardly directed applicator tip terminating immediately above the cannula groove, whereby a cannula in said groove will wipe off an adhesive drop on said applicator.

4. A machine for assembling hypodermic needles as set forth in claim 1, wherein the means for feeding a cannula is a hopper holding a supply of cannulas in horizontal position; and longitudinal grooves are provided in the reciprocating slide for at least the length of the slide passing under the cannula hopper, whereby the slide contacts the middle portion of a cannula without contacting the base or point of the cannula.

5. A machine for assembling hypodermic needles as set forth in claim 1, wherein the means for axially advancing a hub in the hub groove is a stationary cam surface which presses against the base of the hub urging said hub progressively transversely inward during advance of the slide.

6. A machine for assembling hypodermic needles as set forth in claim 1 wherein the means for feeding a cannula is a hopper adapted to receive a supply of oriented, horizontal cannulas, said hopper having a front guide section and a rear guide section, the lower portion of which slopes toward the front guide section to define a narrow outlet with which the cannula groove registers when the reciprocating slide is fully retracted.

7. A machine for assembling hypodermic needles comprising: a reciprocating slide; a cannula groove in said slide; means for feeding a single cannula into said groove; a hub groove in said slide axially aligned with said cannula groove means for feeding one hub at a time into said groove, said means including a means for continually orienting said hubs to a tip down position; a hub positioning block having a chamber sufficiently large for the hubs to turn from a vertical to a horizontal position; means for driving the tip end of the leading hub inwardly, repositioning said hub in a horizontal position; means for holding the cannula against axial movement during advance of the reciprocating slide; and means for axially advancing a hub in the hub groove toward a cannula in the cannula groove, to thereby telescope a portion of the cannula into a portion of the hub.

8. A machine for assembling hypodermic needles as set forth in claim 7 wherein a downwardly directed piston is located between the cannula feeding means and the hub feeding means, said piston being adapted to push downwardly on the hub.

9. A machine for assembling hypodermic needles comprising: a reciprocating slide; a cannula groove in said slide; means for feeding a single cannula into said groove;

a hub groove in said slide axially aligned with said cannula groove; means for feeding a single hub into said groove; means for holding the cannula against axial movement during advance of the reciprocating slide; means for axially advancing a hub in the hub groove toward a cannula in the cannula groove, to thereby telescope a portion of the cannula into a portion of the hub; and an ejector mechanism adapted to remove the completed needle from the slide at the end of the advance stroke, said ejector mechanism having two upwardly sloping guide rails, one adapted to slidingly receive the hub flange, the other adapted to slidingly receive the hub tip.

10. A machine for assembling hypodermic needles as set forth in claim 9 wherein the ejector also has an upper guide rail adapted to slidingly receive the top surface of the hub flange and a downwardly depending flange extends from said upper guide rail over the edge of the hub flange, thereby holding the needle hubs slidably within the groove formed by the flange guide rail and the upper flange.

11. A machine for assembling hypodermic needles comprising: a reciprocating slide; a cannula groove in said slide; a hopper adapted to receive a supply of oriented, horizontal cannulas and to feed one of said cannulas into the cannula groove; a hub groove in the slide, said groove being aligned with the cannula groove and axially spaced therefrom; means for continuously feeding a supply of hubs in tip down position to a positioning station; means for orienting each hub to a horizontal position; means for holding the horizontal hub until it drops into the hub groove; a longitudinal slot defined by the walls of the slide between the cannula groove and the hub groove; a longitudinally fixed, spring loaded, plastic block extending parallel to the center line of the slide, located in line with the middle portion of the cannula groove, and adapted to hold the cannula against axial movement during advance of the reciprocating slide; means for applying adhesive to the base of a cannula while held in the cannula groove, said means including a downwardly directed adhesive applicator tip; means for axially advancing a hub in the hub groove toward a cannula in the cannula groove, thereby telescoping a portion of the cannula into a portion of the hub; and an ejector means for lifting the assembled hub and cannula from the grooves in the reciprocating slide as said slide nears the end of its advance stroke.

References Cited in the file of this patent

UNITED STATES PATENTS

| | | |
|---|---|---|
| 2,824,361 | Brown | Feb. 25, 1958 |
| 2,841,937 | Miskel | July 8, 1958 |
| 2,940,164 | Davis | June 14, 1960 |
| 2,974,367 | Doering et al. | Mar. 14, 1961 |
| 2,996,105 | Holderith | Aug. 15 1961 |